United States Patent
Hermann

(10) Patent No.: US 9,553,346 B2
(45) Date of Patent: Jan. 24, 2017

(54) BATTERY SYSTEM WITH SELECTIVE THERMAL MANAGEMENT

(71) Applicant: QuantumScape Corporation, San Jose, CA (US)

(72) Inventor: Weston Arthur Hermann, Palo Alto, CA (US)

(73) Assignee: QuantumScape Corporation, San Jose, CA (US)

( * ) Notice: Subject to any disclaimer, the term of this patent is extended or adjusted under 35 U.S.C. 154(b) by 374 days.

(21) Appl. No.: 13/763,636

(22) Filed: Feb. 9, 2013

(65) Prior Publication Data

US 2014/0227568 A1  Aug. 14, 2014

(51) Int. Cl.
*H01M 10/633* (2014.01)
*H01M 10/657* (2014.01)
(Continued)

(52) U.S. Cl.
CPC ....... *H01M 10/5022* (2013.01); *H01M 10/425* (2013.01); *H01M 10/441* (2013.01);
(Continued)

(58) Field of Classification Search
USPC .. 429/120, 50–52, 149–160; 29/623.1–623.5
See application file for complete search history.

(56) References Cited

U.S. PATENT DOCUMENTS

2003/0008205 A1* 1/2003 Horie .............. H01M 6/42
429/120

2007/0166574 A1* 7/2007 Nakashima ....... H01M 10/0413
429/9
(Continued)

FOREIGN PATENT DOCUMENTS

DE  102009046567 A1  5/2011
WO  2012/144148 A1  10/2012

OTHER PUBLICATIONS

European Search Report mailed Aug. 8, 2014 in EP 14154567, 9 pages.

*Primary Examiner* — Imran Akram
(74) *Attorney, Agent, or Firm* — Squire Patton Boggs (US) LLP

(57) ABSTRACT

The present invention is directed to battery systems. In various embodiments, the present invention provides a battery system having a first battery group and a second battery group. The first battery group and the second battery group can share a single housing, or be positioned within separate housings. The first battery group and the second battery group can each have a plurality of cells configured in parallel, and the two groups can be electrically integrated. When operating at a low temperature, the first battery group is configured to provide electrical energy to a heating module that selectively heats up one or more segments of the second battery group. In addition, the first battery group also provides energy for initial operation of an electric vehicle or equipment. Once the selected segments of the battery group are heated up to an operating temperature, the selected segments supply electrical power to the vehicle or equipment and charge the first battery group. In addition, the selected segments of the second battery group provide electrical energy for heating other segments of the second battery group. There are other embodiments as well.

23 Claims, 18 Drawing Sheets

(51) Int. Cl.
*H01M 10/42* (2006.01)
*H01M 10/44* (2006.01)
*H01M 10/48* (2006.01)
*H01M 16/00* (2006.01)
*H01M 10/6568* (2014.01)
*H01M 10/66* (2014.01)
*H01M 10/6561* (2014.01)

(52) U.S. Cl.
CPC ....... *H01M 10/443* (2013.01); *H01M 10/482* (2013.01); *H01M 10/486* (2013.01); *H01M 10/633* (2015.04); *H01M 10/657* (2015.04); *H01M 10/6561* (2015.04); *H01M 10/6568* (2015.04); *H01M 10/66* (2015.04); *H01M 16/00* (2013.01); *H01M 2010/4271* (2013.01); *H01M 2220/20* (2013.01)

(56) References Cited

U.S. PATENT DOCUMENTS

| | | |
|---|---|---|
| 2010/0089547 A1 | 4/2010 | King et al. |
| 2010/0297483 A1 | 11/2010 | Kawai |
| 2012/0046815 A1 | 2/2012 | Hermann et al. |
| 2012/0126753 A1* | 5/2012 | Carkner .............. H01M 10/615 320/129 |
| 2012/0295142 A1 | 11/2012 | Yan et al. |
| 2013/0004804 A1 | 1/2013 | Robertson et al. |
| 2013/0059172 A1* | 3/2013 | Sastry ................. H01M 2/1077 429/7 |
| 2014/0038009 A1 | 2/2014 | Okawa et al. |
| 2015/0255998 A1* | 9/2015 | Hasegawa ................ H02J 7/04 320/107 |

\* cited by examiner

BATTERY SYSTEM WITH SELECTIVE THERMAL MANAGEMENT

CROSS-REFERENCES TO RELATED APPLICATIONS

NOT APPLICABLE

STATEMENT AS TO RIGHTS TO INVENTIONS MADE UNDER FEDERALLY SPONSORED RESEARCH AND DEVELOPMENT

NOT APPLICABLE

BACKGROUND OF THE INVENTION

The present invention is directed to battery systems.

Battery systems in recent years have been used in more and more applications. For a long time, car batteries were primarily used to start vehicles and/or supply electricity to various electronics of the vehicles, not used to power the drivetrain. With advent of new battery technologies, more and more vehicles now utilize battery systems as a traction power source. Most batteries have their operating temperature ranges wherein their performance is highest. For example, many high-energy density batteries do not function at low temperatures, and become unsafe or quickly degrade at high temperatures. Thus, it is important to provide thermal management for batteries, especially for automotive applications.

Unfortunately, conventional battery systems and their thermal management systems thereof have been inadequate. Therefore, it is desirable to have new and improved battery systems and methods thereof.

BRIEF SUMMARY OF THE INVENTION

The present invention is directed to battery systems. In various embodiments, the present invention provides a battery system having a first battery group and a second battery group. When operating at a low temperature, the first battery group is configured to provide electrical energy to a heating module that selectively heats up selected one or more segments of the second battery group. In addition, the first battery group also provides energy for initial operation of the electrical vehicle or equipment. Once the selected segments of the battery group are heated up to an operating temperature, the selected segments supply electrical power to the vehicle or equipment, and return charge to the first battery group. In addition, the selected segments of the second battery group provide electrical energy for heating other segments of the second battery group. There are other embodiments as well.

According to an embodiment, the present invention provides a battery system that includes a first battery group, which comprises a first battery group having a first capacity. The first battery group is configured to operate at a first temperature. The system also includes a second battery group electrically coupled to the first battery group. The second battery group comprises a second capacity and is adapted to operate at a second temperature. The second capacity is greater than the first capacity. The second temperature is higher than the first temperature. The second battery group has at least a first battery segment and a second battery segment. The system also includes a first heating module electrically coupled to the first battery group. The system additionally includes a thermal path thermally coupled to the first group and including a first thermal segment and a second thermal segment. The first thermal segment is thermally coupled to the first battery segment. The second thermal segment is thermally coupled to the second battery segment. The system additionally includes a control module that is configured to cause the first battery group to power the first heating module to selectively provide heat to the first battery segment by the first thermal segment and the second battery segment by the second thermal segment.

According to another embodiment, the present invention provides a battery system that includes a first battery group. The first battery group has a first energy capacity and is adapted to operate at a first temperature of less than 0 degree C. The system also includes a second battery group electrically coupled to the first battery group in parallel. The second battery group has a second energy capacity and is adapted to operate at a second temperature. The second energy capacity is greater than the first energy capacity. The second temperature is higher than the first temperature. The second battery group has at least a first battery segment and a second battery segment. The system also has a first heating module electrically coupled to the first battery group. The system additionally includes a thermal path thermally coupled to the first group and including a first thermal segment and a second thermal segment. The first thermal segment is thermally coupled to the first battery segment. The second thermal segment is thermally coupled to the second battery segment. The system also includes a control module configured to cause the first battery group to power the first heating module to transfer heat to the first battery segment via the thermal path if the first battery segment is at a temperature below a predetermined threshold level.

According to yet another embodiment, the present invention provides a method for operating a battery system. The battery system has a first battery group and a second battery group. The second battery comprises a plurality of battery segments electrically coupled to one another in parallel. The method includes receiving a signal for starting the battery system. The method also includes determining a first temperature of the second battery group. If the first temperature is below a predetermined threshold, the following steps are performed:

using and partially discharging the first battery group;
  selecting a first battery segment from the plurality of battery segments;
  heating the first battery segment using energy from the first battery group;
  charging the first battery and heating a second battery segment by energy from the first battery segment once the first battery segment is at an operating temperature.

It is to be appreciated that embodiments of the present invention provides numerous advantages over existing systems and methods thereof. Among other things, by selectively heating segments of a primary battery group, an electrical vehicle can start operation more efficiently and sometime quickly. In addition, the parallel configuration of cells as provided in certain embodiments of the present invention allows battery cells in parallel to charge and discharge efficiently. In various embodiments, the format factor and interface are compatible with existing electrical vehicles, thereby making adoption and use of battery systems convenient and low cost. There are benefits as well

DETAILED DESCRIPTION OF THE INVENTION

Figure 1:
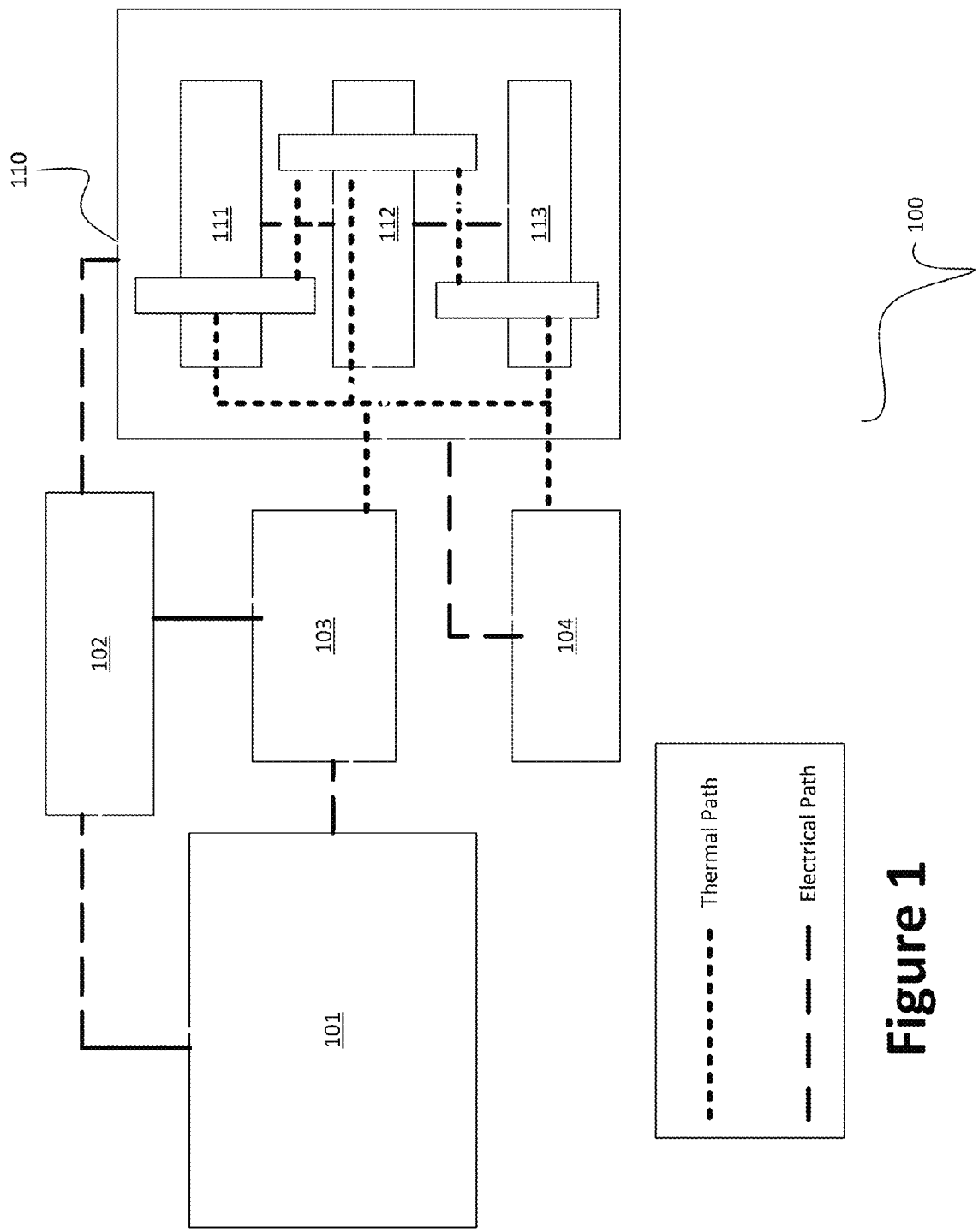
FIG. 1 is a simplified diagram illustrating a battery system according to an embodiment of the present invention.

The present invention is directed to battery systems. In various embodiments, the present invention provides a battery system having a first battery group and a second battery group. The first battery group and the second battery group can share a single housing, or be positioned within separate housings. The first battery group and the second battery group can each have a plurality of cells configured in parallel, and the two groups can be electrically integrated. When operating at a low temperature, the first battery group is configured to provide electrical energy to a heating module that selectively heats up one or more segments of the second battery group. In addition, the first battery group also provides energy for initial operation of an electric vehicle or equipment. Once the selected segments of the battery group are heated up to an operating temperature, the selected segments supply electrical power to the vehicle or equipment and charge the first battery group. In addition, the selected segments of the second battery group provide electrical energy for heating other segments of the second battery group. There are other embodiments as well.

As explained above, conventional battery systems for operating electric vehicles and other types of equipment are inadequate. Among other things, performance of batteries is temperature-dependent. For most battery types, operating at low temperatures (e.g., 0 degree Celsius) is difficult, if possible. For example, most lithium-ion cells are not in good operable condition below 0 degree Celsius, although some might still function at a temperature of −30 degrees Celsius. The inability of battery systems to operate in low temperatures has made it sometimes necessary for battery systems operating in cold environment to have heaters to warm up the cells to an operating temperature. Similarly, batteries also have problems operating at high temperature, as there is a risk of accelerated degradation. For some vehicle battery systems, there are mechanisms for cooling the battery cells.

Unfortunately, the existing systems for temperature control have been inadequate. For example, a conventional battery thermal management system heats up all battery cells simultaneously, which is inefficient and slow. It is therefore to be appreciated that embodiments of the present invention provide techniques for selectively heating up one or more segments of a battery system. Each segment may include one or more battery cells. By only heating up selected battery segments, the heating up time, which translates to vehicle or equipment start up time, is reduced, and the amount of energy for heating can be reduced. There are other benefits as well.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1 is a simplified diagram illustrating a battery system according to an embodiment of the present invention. This diagram is merely an example, which should not unduly limit the scope of the claims. One of ordinary skill in the art would recognize many variations, alternatives, and modifications. As shown in FIG. 1, a battery system 100 comprises a battery group 101 and a battery group 110. The battery group 101 has a smaller capacity compared to the battery group 110. The battery group 101 is used as a booster group for starting a vehicle or equipment and for powering the heating module 103 under certain conditions. Depending on the application, various types of battery can be used for the battery groups 101 and 110. As explained, the battery group 110 may contain solid state high energy density batteries. The battery group 101 may contain a more conventional type of battery, such as lithium ion batteries employing conventional cathodes (e.g., lithium iron phosphate), nickel metal hydride batteries, etc. It is to be appreciated that other battery chemistries are possible as well. For example, the term "battery group" refers to a collection of battery cells with similar electrical property and/or chemical composition. A battery group may be positioned within a single housing to form a battery pack. In certain embodiments, multiple battery groups may share a single housing.

In a specific embodiment, the battery group 101 is able to deliver relatively high power (e.g., about 60-200 kW peak and 30-80 kW continuous) and have a modest capacity (e.g., about 1-20 kWh, for example 5 kWh). This implies a discharge (C-rate) of about 5-50 C peak and about 2-20 C continuous. Charge acceptance for regenerative braking is in the range of about 1-10 C. The voltage range of the group may be anywhere from about 150 to 450V and may generally have a more narrow operational voltage range than the energy group 110.

The battery group 110 is used as the primary energy source of battery system 100. In various embodiments, the battery group 101 comprises conventional battery cells, which are capable of operating low temperature (e.g., −30° C.). In addition to providing energy to the heating module 103, the battery group 101 is also used for starting up a vehicle. For example, at a low temperature (e.g., below 0 degree C.), the battery group 110 is substantially non-operational, and the battery group 101 supplies electrical energy to drivetrain of an electrical vehicle or an equipment, while the battery group 110 is being heated up to its operating temperature. The battery group 110 has a greater energy capacity (e.g., about 50-150 kWh, for example 80 kWh) than the battery group 101. The battery group 110, at its operating temperature, is configured to power a vehicle (or equipment) and recharge the battery group 101. In various embodiments, the power capability of the battery group 110 can be about 60 to 300 kW peak and about 30-100 kW continuous. This implies discharge (C-rates) of about 1-6 C peak and about 0.2 to 2 C continuous. Charge acceptance for regenerative braking is in the range of about 0.1 to 1 C. The voltage range of the battery group 110 may be anywhere from about 100 to 450V.

In various embodiments, the battery group 101 and battery group 110 are electrically coupled in parallel, bypassing the power module 102. The parallel configuration allows the battery group 110 to charge the battery 101 once it becomes operational. The non-operational segments of the battery group function similarly to an open circuit due to their high internal resistance.

The heating module 103 is power by the battery group 101 to generate heat. As shown in FIG. 1, the heating module 103 is thermally coupled to various segments of the battery group 110. In an embodiment, the heating module 103 uses fluid with high specific heat (e.g., water) to transfer heat to one or more segments of the battery group 110. For example, the heated fluid and/or other heat transferring agent is pumped to one or more selected segment of the battery group 110. In various embodiments, the battery system 100 comprises one or more pumps and valves for selectively delivering heat to predetermined segments of the battery group 110 via thermal paths (e.g., fluid lines). In a specific embodiment, each fluid line permits fluid flow in only one direction. It is to be appreciated that the thermal path can be configured to deliver hot or cold fluid as necessary to control the temperature of the battery groups. Stated another way, the energy group can receive or donate thermal energy.

Another source of thermal energy that may be used to heat for the battery groups is current from the battery groups themselves flowing through a relatively low impedance load. For example, this form of heating may be employed during a cold start to reduce the requirements of the battery group 101 to provide energy for elevating the temperature of the battery group 110. The conditions under which this short circuit is executed are chosen and managed via feedback control administered by a control module so that the voltage of the battery group 110 segments do not drop to a level at which the cell degrades. For example, the voltage should be maintained above a predetermined potential at which electrochemical dissolution of the anode current collector may take place. This may be accomplished by using a heater element as a load to support a minimum cell voltage. Additionally, the current flow is controlled in a manner avoiding heating the energy group to a temperature that might damage the cells.

During a cold start and during a charge, thermal energy needs to be delivered to selected segments of the battery group 110 to heat them to a temperature that is adequate for high-performance operation. In certain embodiments, the operating temperature of the selected segments of the battery group 110 is maintained at approximately 25° C. to 80° C. After the battery group 110 is in an operating mode (e.g., above the minimum operating temperature and providing power to propel the vehicle), it may not be necessary to continue heating it. In fact, the battery group 110 (or segments of the battery group) may generate too much heat, in which case it needs to be cooled. The thermal path may be employed to provide needed cooling. In certain embodiments, the battery system provides coolant to a heat exchanger with either the outside air or a refrigerant. For example, a valve in the group is used to direct the coolant outside the group for this cooling.

In certain implementations, an external charger (not shown) is used to provide high power electrical energy to rapidly charge the battery group 110. For example, the external charger provides not only electrical power to charge the battery group 110 but may also provide heat energy via the thermal path. Charging of the battery group may be conducted much faster if the battery group 110 or selected segments thereof is heated.

For illustration purposes, the battery group 110 comprises battery segments 111, 112, and 113. Each battery segment can have a predetermined number of battery cells. For example, the battery group 110 can have a number of battery segments, each having multiple battery cells.

For example, a battery module refers to a collection of many cells that are in series, but maybe not the entire series chain. A battery segment refers to a group of cells thermally controlled together, includes at least one cell from each series element. For example, a battery segment may include more than one battery module. A series chain refers to a structure that contains one or more cells in parallel then connected in series up to the full series voltage for this chain. A battery pack refers a unit that provides external protection from high voltage exposure and internal protection from the environment and may contain one or more series chains. For example, a battery pack may include both an energy series chain and a boost series chain communicating through a DC-DC power converter, or those might be different packs possibly with a DC-DC power converter inside or outside the either pack.

As mentioned above, it is often inefficient to heat up the entire battery group 110 to its operating temperature, as the battery group 110 can be too large to heat up quickly. The battery segments are electrically connected to one another, and thermally coupled to the heating modules 103 and 104. For example, the heating module 103 initially heats up only the segment 111 of the second battery group 110. Since substantially all the heating generated by the heating module 103 is transferred to the segment 111, it heats up and reaches its operating temperature quickly. Once the segment 111 is operational, it powers the heating module 104, which provides heat to other segments of the second battery group 110.

Once the segment 111 of the second battery group 110 becomes operational, the second battery group 110 becomes, at least partially, operational. As shown in FIG. 1, both the first battery group 101 and the second battery group 110 are electrically coupled to each other via the power module 102. For example, the battery groups 101 and 110 have different operating voltage, and the power module 102 comprises a DC-DC converter that allows the battery group 110 to charge the battery group 101. When operational, the second battery group 110 powers the heating module 104 and the electrical vehicle or equipment, and charges the first battery group 101. It is to be appreciated that by keeping the first battery group 101 charged, it can later be used for heating and initial operation again. In a specific embodiment, the power module 102 and the battery groups 101 and 110 are electrically coupled to one another in parallel.

The power module 102 allows the battery group 110 to charge the battery group 101 under certain circumstances. For example, the battery group 101 must have sufficient energy to execute a cold start, i.e., a start in which the energy group is too cold to effectively deliver energy to propel the vehicle, including powering vehicle accessories. To ensure that the battery group 101 has sufficient energy for the next cold start, the battery group 110 may charge it through the power module 102, which as explained above can be a DC-DC converter or coupler. Of course, the battery group 110 must be at a sufficiently high temperature during this charge. Depending on the application, the power module 102 is capable of accepting voltages in the range of about 100-450V and outputting power in what may be a more narrow voltage range between about 150 and 450V. Example ranges may be about 150-350V input and about 220-300V output. The power capability of the power module 102 should be sufficient to recharge the battery group 101 in the about 20-120 minute range, or about 3-30 kW. In a specific embodiment, the DC couple may be unidirectional and isolated.

In certain embodiments, there may also be a third group having a use limited to very short periods after key on and possibly for powering accessories during an "idle" period described below. It is not depicted in FIG. 1. It gets charged during normal operation through a separate DC couple (also not shown). The third group is not used to operate a vehicle, but can be for waking the battery system up and/or for power accessories during idle. For example, the third battery group can be charged once the system is on through another DC-DC.

Figure 2:
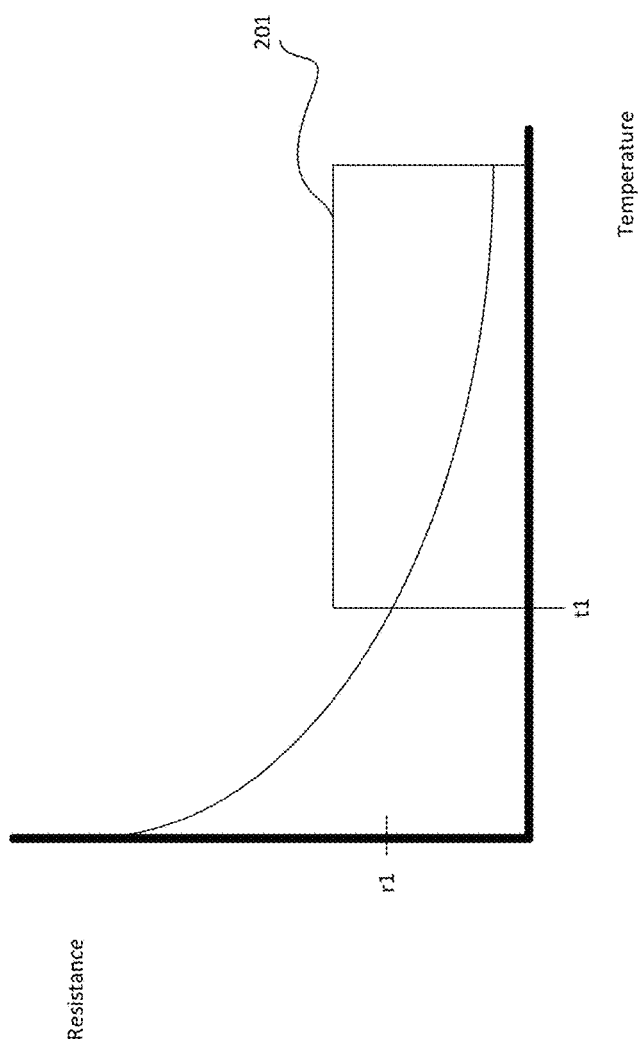
FIG. 2 is a simplified diagram illustrating relationship between internal resistance and temperature of a battery segment.

As shown in FIG. 1, segments of the battery group 110 are electrically coupled to one another. In various embodiments, segments of the battery group 110 are electrically arranged in parallel, which allows the segments to recharge one another. In certain embodiments, each segment has a plurality of cells that are configured in series within their perspective segment, and segments are configured in parallel to one another. In an alternative embodiments, as described below in FIG. 8, cells are in series within a segment in parallel to corresponding cells of other battery segments. For example, the battery segment 111 is warmed up to an operating temperature before segments 112 and 113. At its operating temperature, the battery segment 111 discharges and provides energy for (1) recharging the battery group 101, (2) powering vehicle and/or equipment that the battery system 100 is connected to, and (3) providing energy to warm up battery segments 112 and/or 113. At a cold state, the battery segment 112 is not operable and has a high internal resistance, which can be large enough to act like an open circuit in relation to the battery segment 111. Once the battery segment 112 is in operating temperature, the difference in voltage potential between segments 111 and 112 causes current to flow from segment 112 to segment 111, thereby charging the segment 111. FIG. 2 is a simplified diagram illustrating relationship between internal resistance and temperature of a battery segment. It is to be appreciated that the graph is only to provide an illustration and is not an indication of battery characteristics. As shown in FIG. 2, at low temperature, the internal resistance of the battery segment 112 can be very high and the segment 112 is not operational. Once temperature reaches the operational temperature threshold t1, the internal resistance drops to r1. At r1, the battery segment 112 is capable of supplying energy to the segment 111, thereby charging it.

In various embodiments, as described below, a battery system with a main battery group (e.g., battery group 110) and a booster battery group (e.g., battery 101) selects the battery group to use based on the ambient temperature and battery capacity.

Now referring back to FIG. 1. In various embodiments, the operation of battery groups and heating modules are controlled by a control module. For example, the battery system 100 comprises sensors that monitor the electrical and thermal properties of the battery groups such as voltage and temperature. The control module, not shown in FIG. 1, based on the temperature of battery group 110, determines whether it is needed to heat up the battery group 110. Once it is determined that the second battery group 110 needs to be heated up, it also determines which segments are to be heated up. Various algorithms may be used to determine which of the two battery groups is deployed and for which purpose under the various conditions dictated by environmental parameters such as ambient temperature, driving conditions, states of charge and temperatures of the energy group and the boost group, etc. These algorithms may comprise stored data and instructions and a processor for executing the instructions. Alternatively, the algorithms may be implemented as dedicated hard coded logic.

In various embodiments, the algorithms are implemented in a control module or a battery management system (BMS). The BMS contains the necessary logic (processor and instructions for example) and electrical interfaces to sensors, switches, etc. In some cases, a single BMS controls both the primary energy group and the boost group. In other cases, separate BMSs may be provided for the two groups, in which case there may be a separate master controller providing high level instructions to the BMSs and coordinating their actions. In an implementation, one of the two BMSs is a "master" and the other is a "slave".

In various embodiments, the BMS monitors various characteristics of battery segments of the main battery group and the booster battery group. For example, BMS monitors SOE, temp, and/or other characteristics in real time. Using known properties such as RvsT (resistance v. temperature), RvsSOC (resistance v. state of charge), and OCVvsSOC (operating current/voltage v. state of charge), the BMS can be configured using a predictive model to prevent large parallel current between the battery segments/groups/cells that could cause problems or catastrophic results. For example, if the SOC of a first battery segment is below a threshold level, the BMS heats up another second battery segment before the SOC of the first battery is too low, which could leads to an undesirably high current flow from the second battery segment when it becomes operational.

Overall, the battery system 100 is configured to operate in a manner that controls heating and electrical performance. The system ensures that the energy group operates within a defined temperature window chosen to provide safe efficient operation of the high temperature batteries of the primary energy group. In various embodiments the system additionally ensures that the states of charge of the batteries in the energy group and the boost group are maintained at appropriate levels to support long battery life, efficient operation, and acceptable cold start performance.

Figure 3:
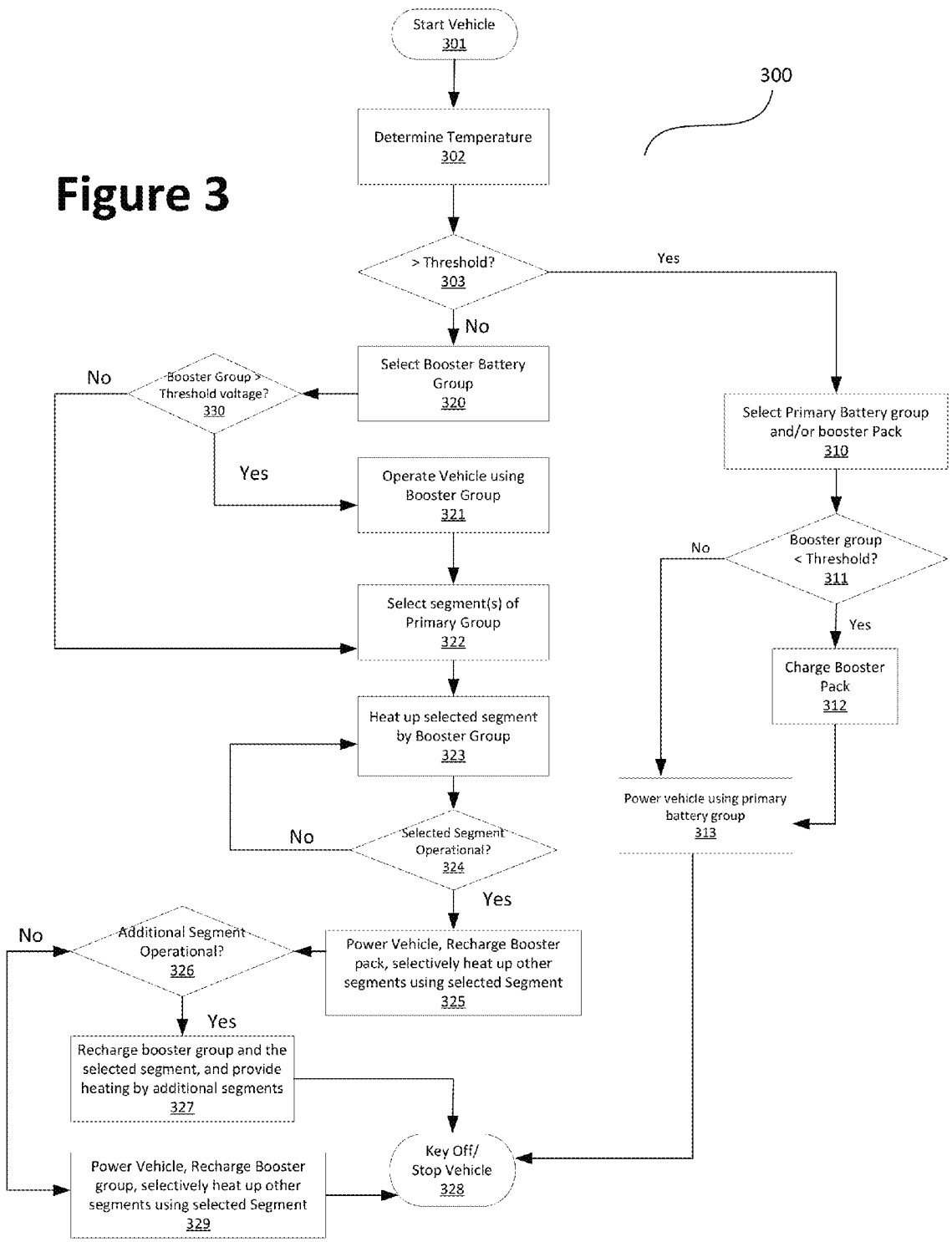
FIG. 3 is a simplified flow diagram illustrating a processing for operating a battery system according to an embodiment of the present invention.

FIG. 3 is a simplified flow diagram illustrating a processing for operating a battery system according to an embodiment of the present invention. This diagram is merely an example, which should not unduly limit the scope of the claims. One of ordinary skill in the art would recognize many variations, alternatives, and modifications. For example, various steps as shown in FIG. 3 can be added, removed, modified, rearranged, replaced, repeated, and/or overlapped, which should not limit the claims. For example, the process 300 shown in FIG. 3 can be implemented with the battery system 100 shown in FIG. 1 and described above. Among other things, the process 300 is used for a battery system that includes a primary battery group that operates at a higher temperature than a booster battery group, and the booster battery group is configured to provide energy to heat up one or more segments of the primary battery. The battery system can be used to provide power to an electric vehicle.

The process 300 starts at step 301, where a vehicle is started. At the step 302, temperature of the primary battery group is determined. In various embodiments, the primary battery group comprises a plurality of battery segments, each of which can be individually heated via a thermal path. For example, thermal sensors are deployed on each of the battery segment of the primary battery group. At step 303, the temperature of the primary battery group is compared to a predetermined threshold value, which may correspond to the operating temperature of the primary battery group.

If the temperature of the primary battery group is greater than the threshold value, there is no need to heat up the primary battery group. At step 310, the primary battery group is selected for providing energy to the vehicle. In certain embodiments, the primary battery group and the booster battery back are both selected for starting and powering the vehicle. In addition to supplying energy to the vehicle drivetrain and/or accessories thereof, the primary battery group may also charge the booster battery group if need. At step 311, the state of energy (SOE) of booster battery group is determined the compared to a threshold value. For example, SOE can be measure by the voltage value and/or other characteristics of the booster battery group. If the SOE of the battery group is determined to be greater than a predetermined threshold value, the primary battery group and/or the booster battery group continue to power the vehicle, at step 313, until the vehicle is turned off at step 328. On the other hand, if the booster group's SOE is at a level lower than the predetermined threshold value, the primary battery group charges the booster group, at step 312. For example, as shown in FIG. 1, the primary battery group is electrically coupled to the booster group via a power module (e.g., DC-DC power converter) and charges the booster battery group via the power module. Depending on the application, the primary battery group and the booster battery group may be electrically configured in parallel, where the difference in voltage potential between the two battery groups causes the primary battery group to charge the booster battery group. After the booster battery group is charged, the primary battery group and/or the booster battery group continue to power the vehicle, at step 313, until the vehicle is turned off at step 328.

Now referring back to step 303, where the temperature of the primary battery group is compared to a threshold value. If the temperature of the primary battery group is lower or equal to a predetermined threshold value, the booster battery group is selected at step 320. Depending on the state of operation, the booster battery group may or may not have enough energy to both operate the vehicle and heating up the primary battery group. At step 330, the SOE of the booster battery group is compared to a predetermined threshold value. For example, the threshold value can be about 30% of the booster battery group capacity. If the booster battery group's SOE is greater than a threshold value, the booster battery is used to power the electric vehicle, at step 321. On the other hand, if the booster battery group's SOE is lower than the threshold value, the booster battery group is only used for heating up the selected segments of the primary battery group. At step 322, one or more segments of the primary battery group are selected. It is to be appreciated that by selectively heating one or more segments of the primary battery group as opposed to heating the entire primary battery group, the primary battery group can provide operating power more quickly (i.e., heating one segment of the primary battery group is quicker than heating the entire primary battery group).

The selection of the primary battery group segment is needed because segments of the primary battery group may not be at the same SOE. For example, in a prior operation of the vehicle, a first segment of the primary battery is used and substantially depleted, and before it gets recharged by other segments of the primary battery, the vehicle is turned off. Heating up this first segment and relying on it for subsequent operation of the vehicle can be a problem, as the first segment may not have enough energy to power the vehicle and/or heat up other battery segments. For example, the step 322, the segment of the primary battery group is selected based on SEO of battery segments, which may be based on the previous stored SOE of each battery segment and/or measured SOE. For example, the BMS of the battery system includes a computer readable memory that stores SOE of battery segments.

At step 323, the booster battery group heats up the selected segment(s) of the primary battery group. For example, the booster battery group is electrically coupled to a heater (e.g., as shown in FIG. 1) that transfers heat to the selected segment(s) of the primary battery group via a resistive heater and a thermal path (e.g., fluid pipe). At step 324, whether the selected segment(s) of the primary battery group is operational is determined. For example, the temperature of the selected battery segment is monitored and once it reaches a threshold value, the selected battery segment is deemed operational. In an embodiment, the electrical properties (e.g., voltage, etc.) of the selected battery segment are monitored; the selected battery segment is deemed operational if its resistance drops below a threshold value. For example, the BMS in described above comprises a table of threshold values related to the resistance v. temperature characteristics of various battery segments. In addition, the BMS may also comprise stored instruction related to other contingency and scenarios of battery operation.

Once the selected segment of the primary battery group is determined to be operational at step 324, it is used for (1) providing energy to the vehicle, (2) recharge the booster battery group, and/or (2) selective heat other segments of the primary battery group. In various embodiments, the booster battery group and the selected segment of the primary battery group are used together to provide energy to the vehicle. At step 326, whether other segments of the primary battery group are operation is determined. As explained above, the operability of other segments of the primary battery group can be determined by their temperature and/or electrical properties. If other segments of the primary battery group are operational, the other segments are used to power the vehicle, and recharge the booster battery group and/or the selected battery segment, at step 327. As explained above, segments of the primary battery can be electrically coupled to one another in parallel, and once a segment is warmed to its operating temperature, it charges other battery segments that are also operational. For example, battery segments that are not operational due to low temperature typically have very high resistance as shown in FIG. 2, and thus are not charged. In various embodiments, fuses are electrically coupled to segments of the primary battery group to prevent charging between segments of very different voltage potential.

On the other hand, if the other segments of the primary battery are not operational, the selected battery continues to provide energy to the heater and the vehicle and/or the booster battery group, at step 329. The operation of the battery systems is stopped at step 328. For example, the battery system and the vehicle stop operating when the vehicle is turned off.

Figure 4:
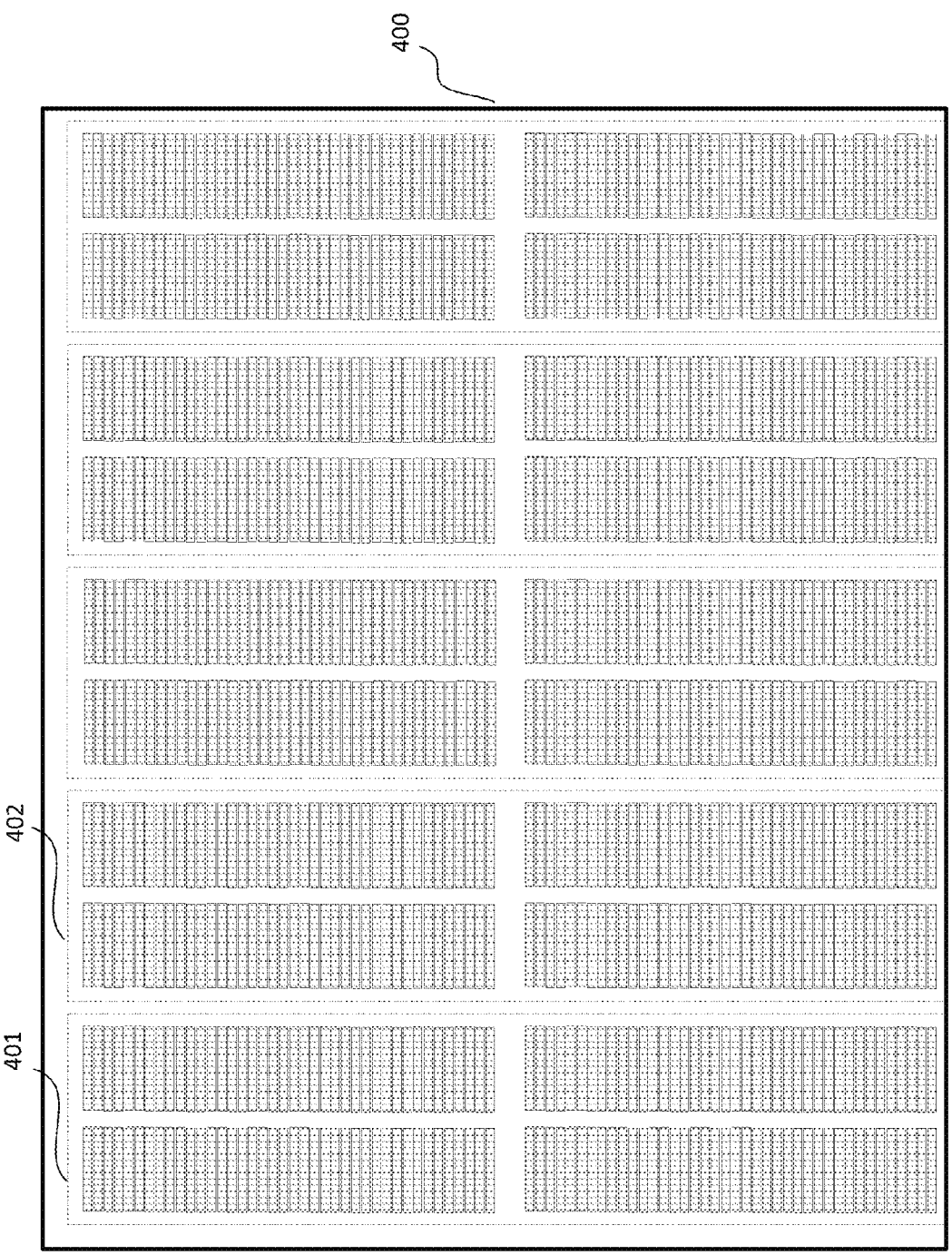
FIG. 4 is a simplified diagram illustrating a battery group according to an embodiment of the invention.

FIG. 4 is a simplified diagram illustrating a battery group according to an embodiment of the invention. This diagram is merely an example, which should not unduly limit the scope of the claims. One of ordinary skill in the art would recognize many variations, alternatives, and modifications. As shown in FIG. 4, the battery group 400 comprises 5 battery segments, including the battery segment 401. The battery segments can be electrically coupled to one another in parallel. For example, each cell of a battery segments are electrically coupled with one or more cells of adjacent battery segments. Thermally, each battery segment can be individually heated. For example, the battery segment 401 can be heated without heating the battery segment 402. In various embodiments, the battery segment 401 and segment 402 are electrically in parallel; the battery segment with higher voltage potential can recharge battery segments with lower potential. Each battery segments comprises one or more battery modules. For example, the battery segment 401 comprises two battery modules, each including a number (e.g., 32 cells or elements). Depending on the application, the number, type, and arrangement of battery modules and segments can be configured to suit the operating requirements.

Figure 5A:
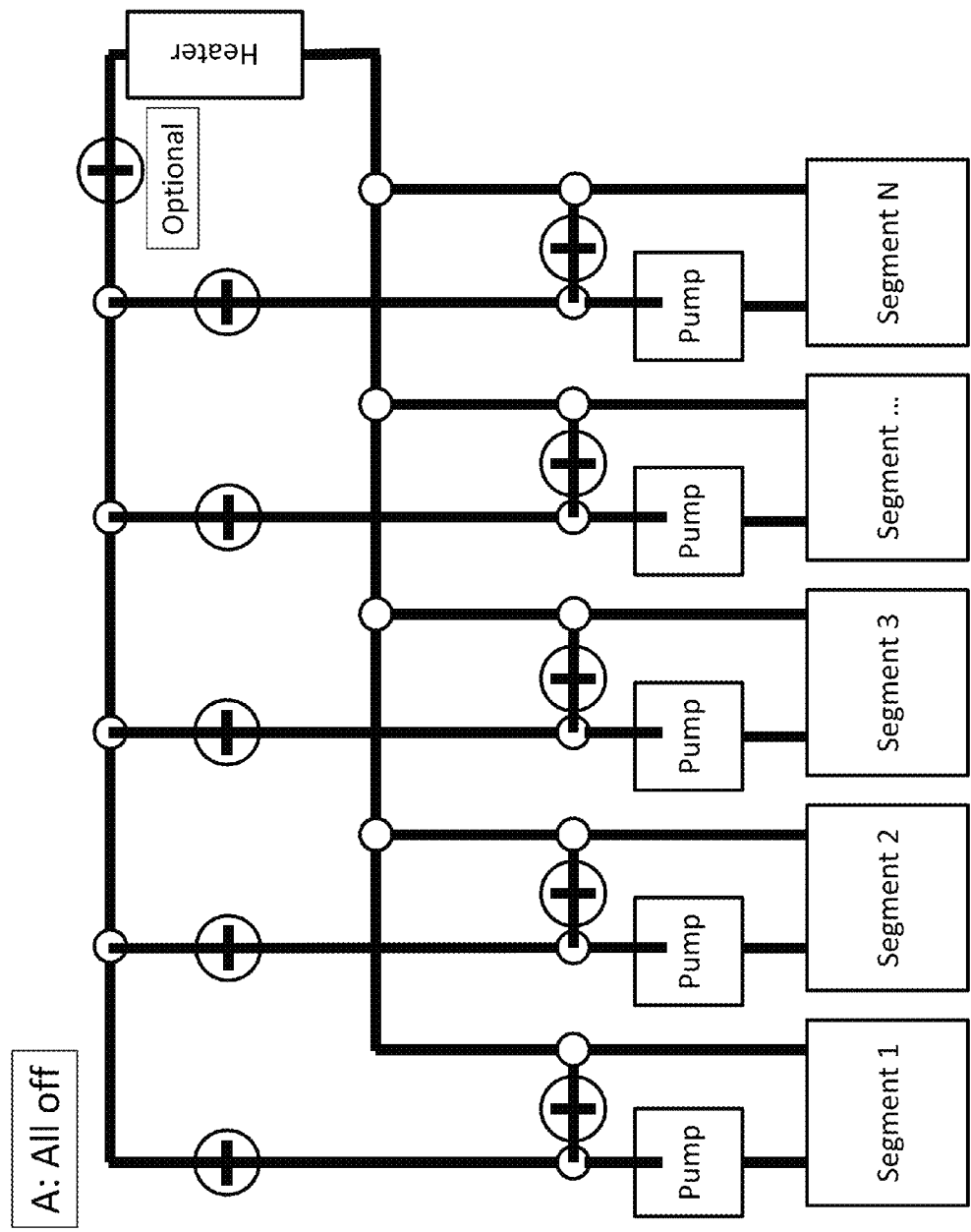
FIGS. 5A-C are simplified block diagrams illustrating operation of battery heating according to an embodiment of the present invention.
Figure 5B:
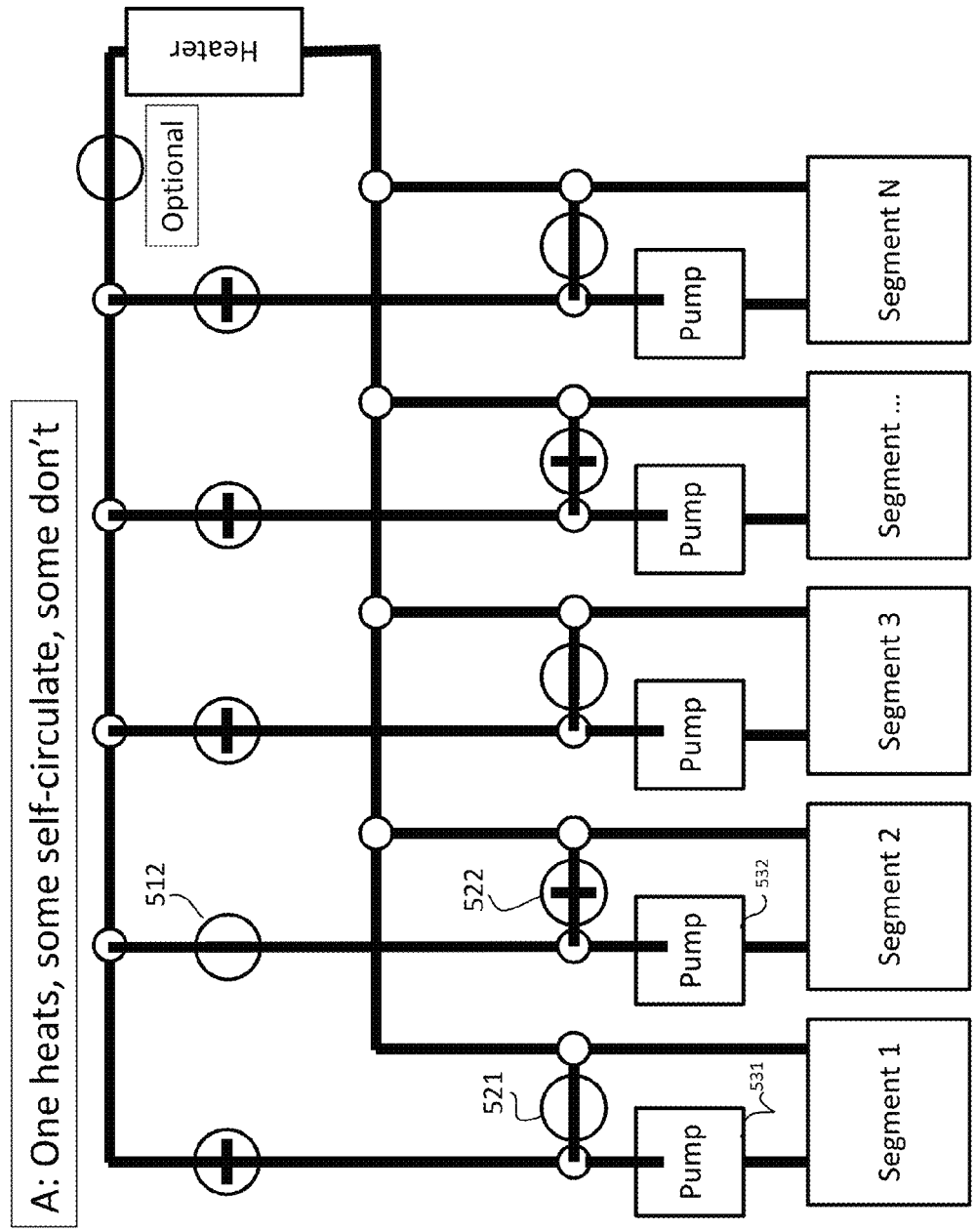
Figure 5C:
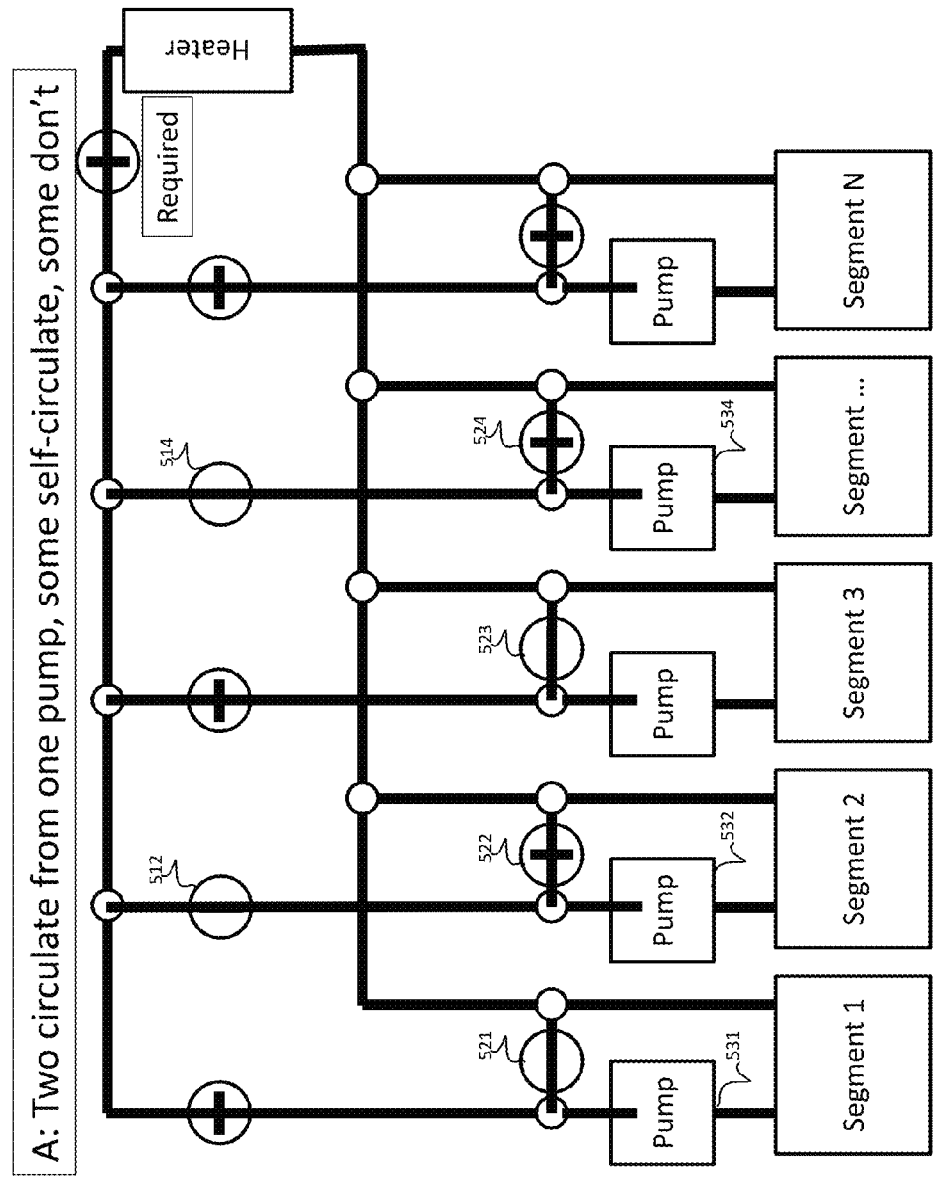

FIGS. 5A-C are a simplified block diagrams illustrating operation of battery heating according to an embodiment of the present invention. This diagram is merely an example, which should not unduly limit the scope of the claims. One of ordinary skill in the art would recognize many variations, alternatives, and modifications. As shown in FIG. 5A-C, a single heater is thermally coupled to battery segments via multiple thermal paths, which is controlled by switches or valves. In various embodiments, the thermal paths comprise pipes that allow heated fluid or vapor to transport. The movement of heat carrying fluid or vapor is facilitated by the pumps. The switches or valves are controlled by a control module, which can be a part a battery management system described above. By selectively turning on and off the switches or valves, the control module can selectively heat the battery segment(s). FIG. 5A illustrates a scenario where heating is off for all battery segments, as all of the valves or switches are turned off. In FIG. 5B, the valve 512 is turn on, and as a result, the heated fluid from the heater is able to pass to the segment 2. For example, the transfer of the heated fluid is facilitated by the pump 532. Since the valve 522 is closed, the fluid from the heater is not circulated for the segment 2, but flows back to the heater. For segment 1, the pump 531 causes the fluid to circulate locally, as the valve 521 is open. FIG. 5C illustrates a scenario where pumps 532 and 534 causes fluid to circulate for segments 2 and 4 without passing through segment 3 or the heater. The pump 531 causes the fluid to circulate for segment 1.

Figure 6A:
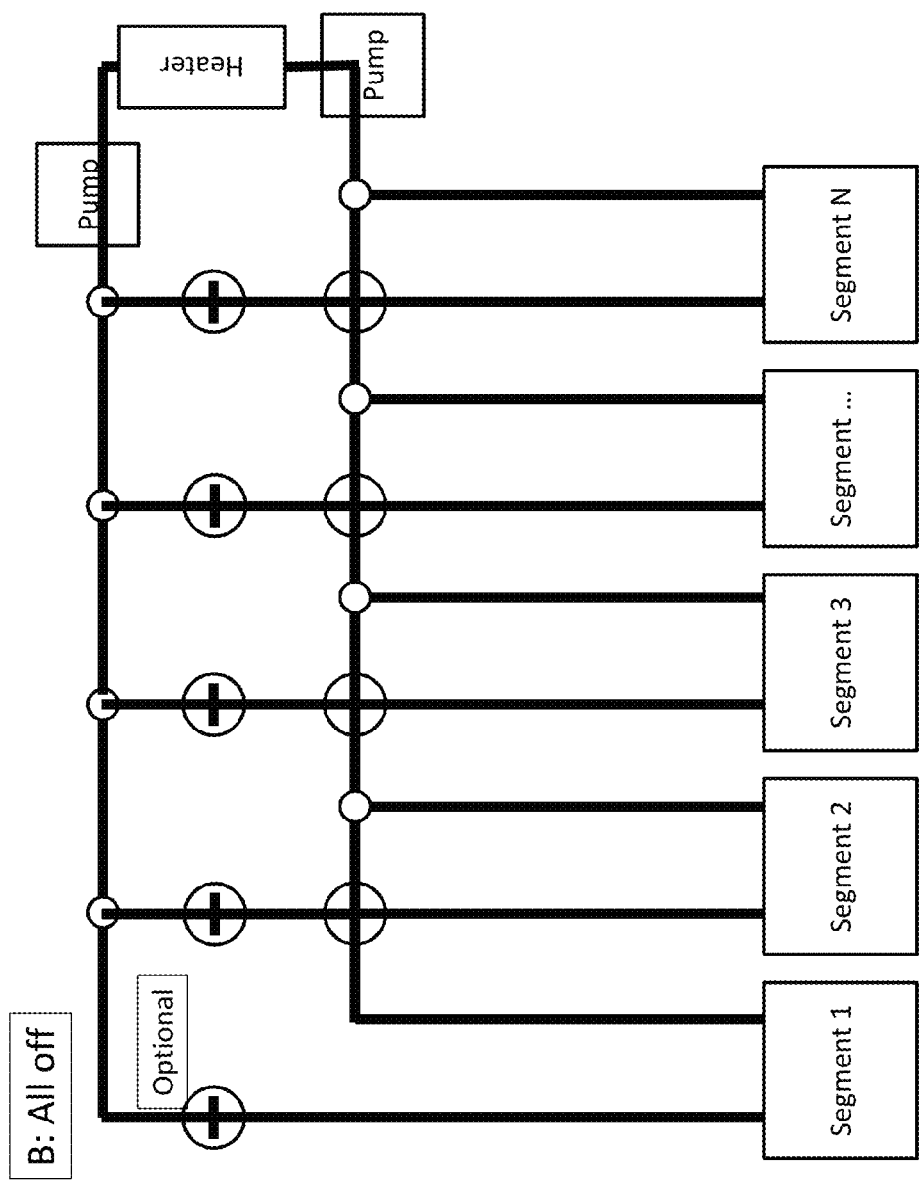
FIGS. 6A-E are simplified diagrams illustrating thermal management for a battery system according to an embodiment of the present invention.
Figure 6B:
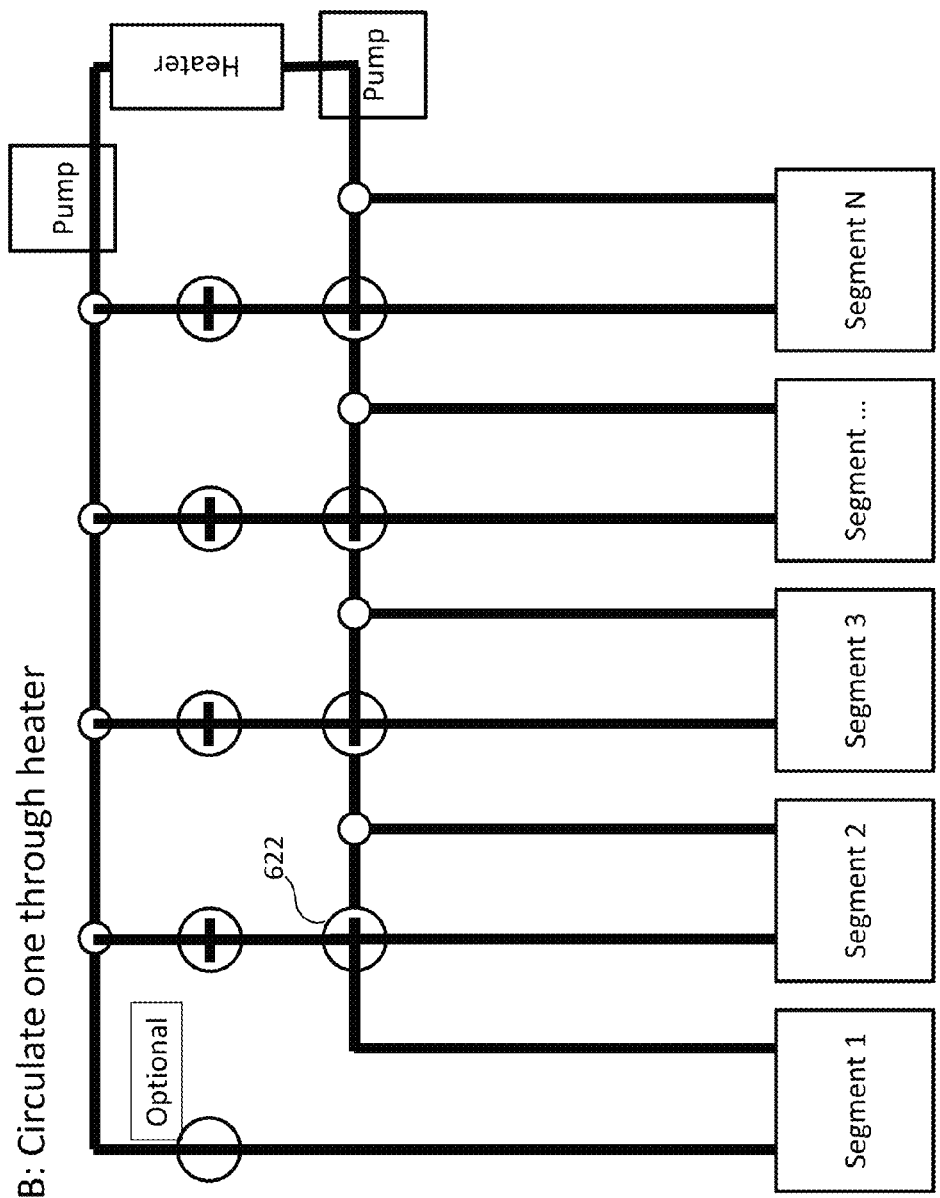
Figure 6C:
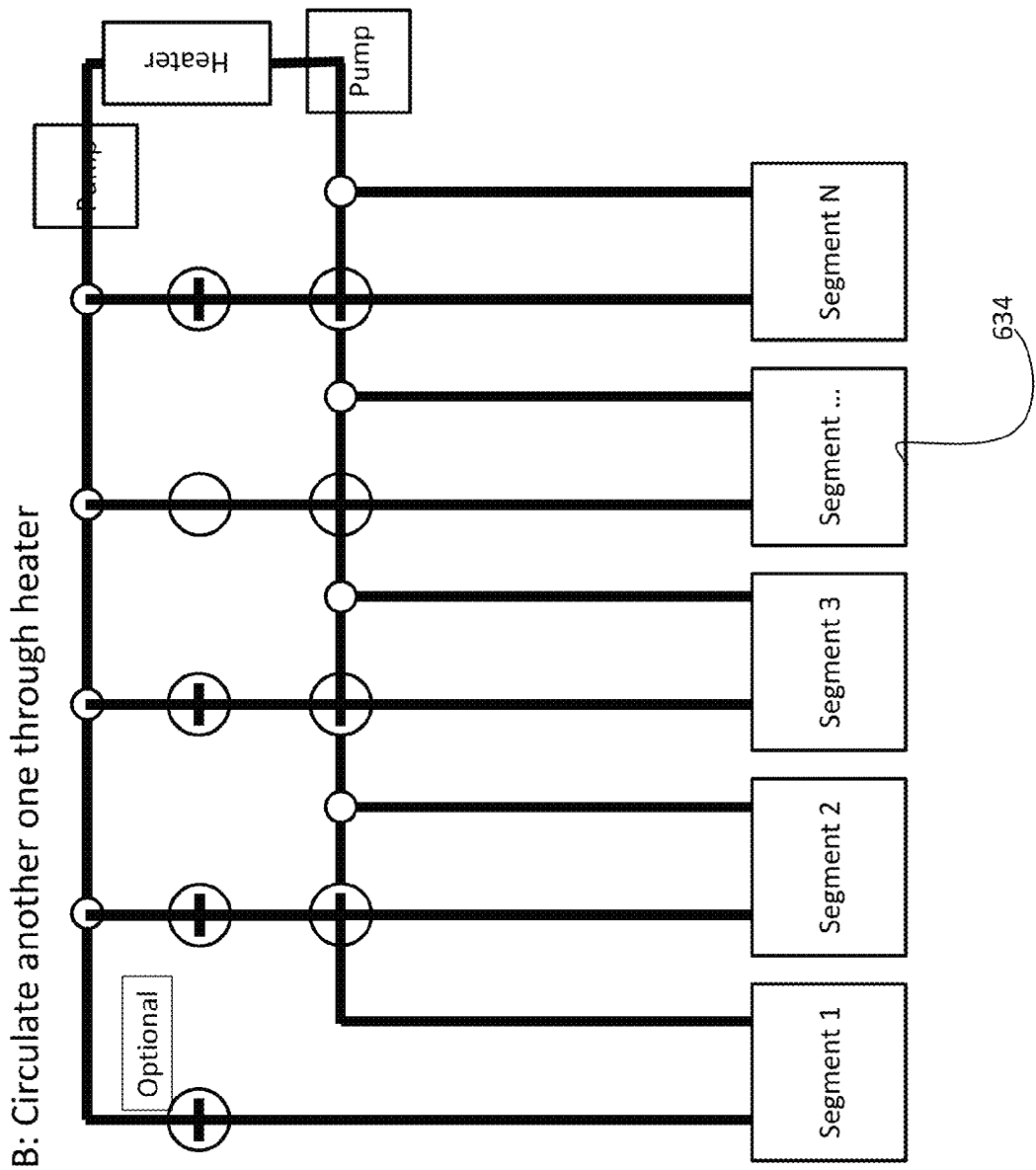
Figure 6D:
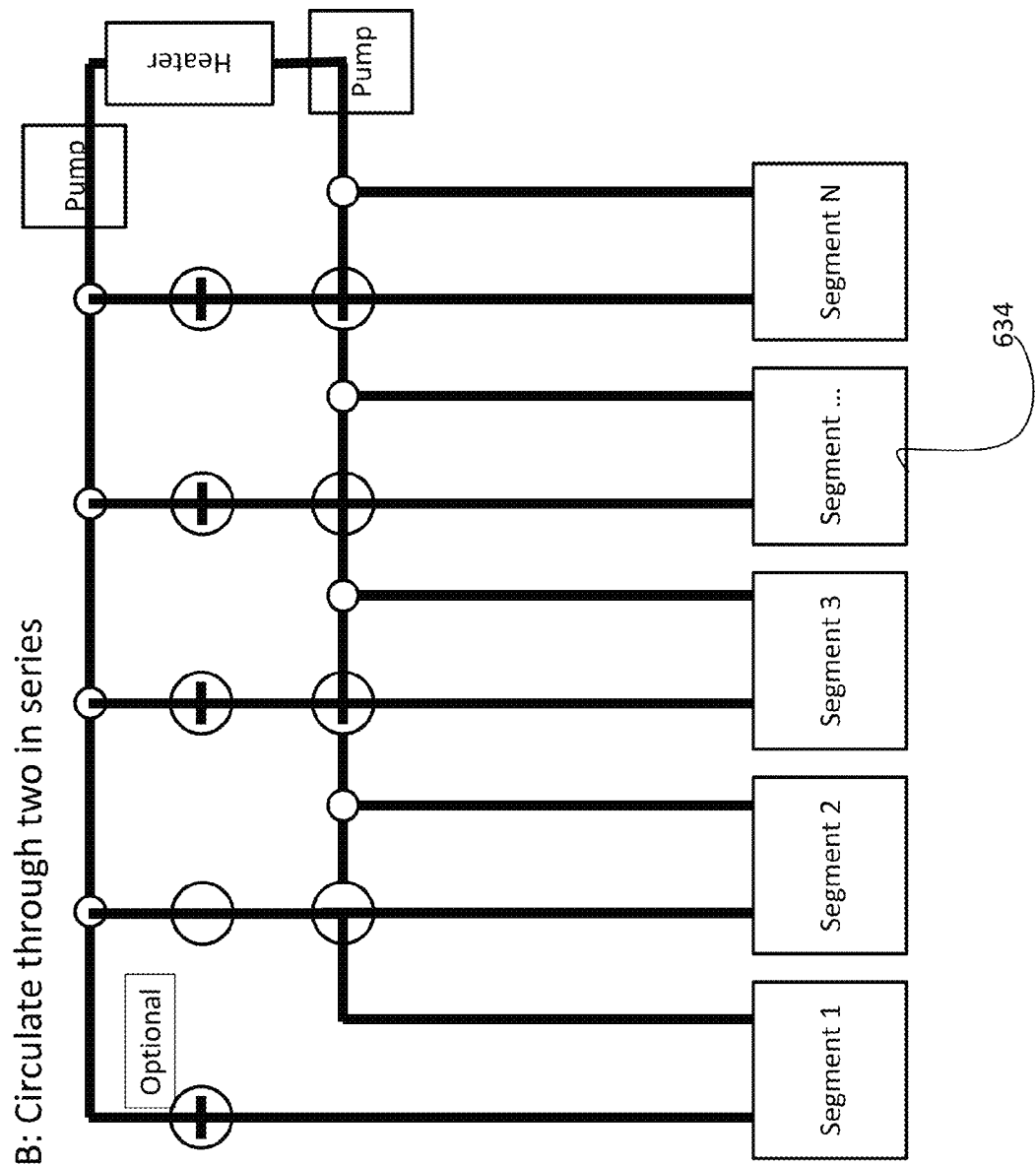
Figure 6E:
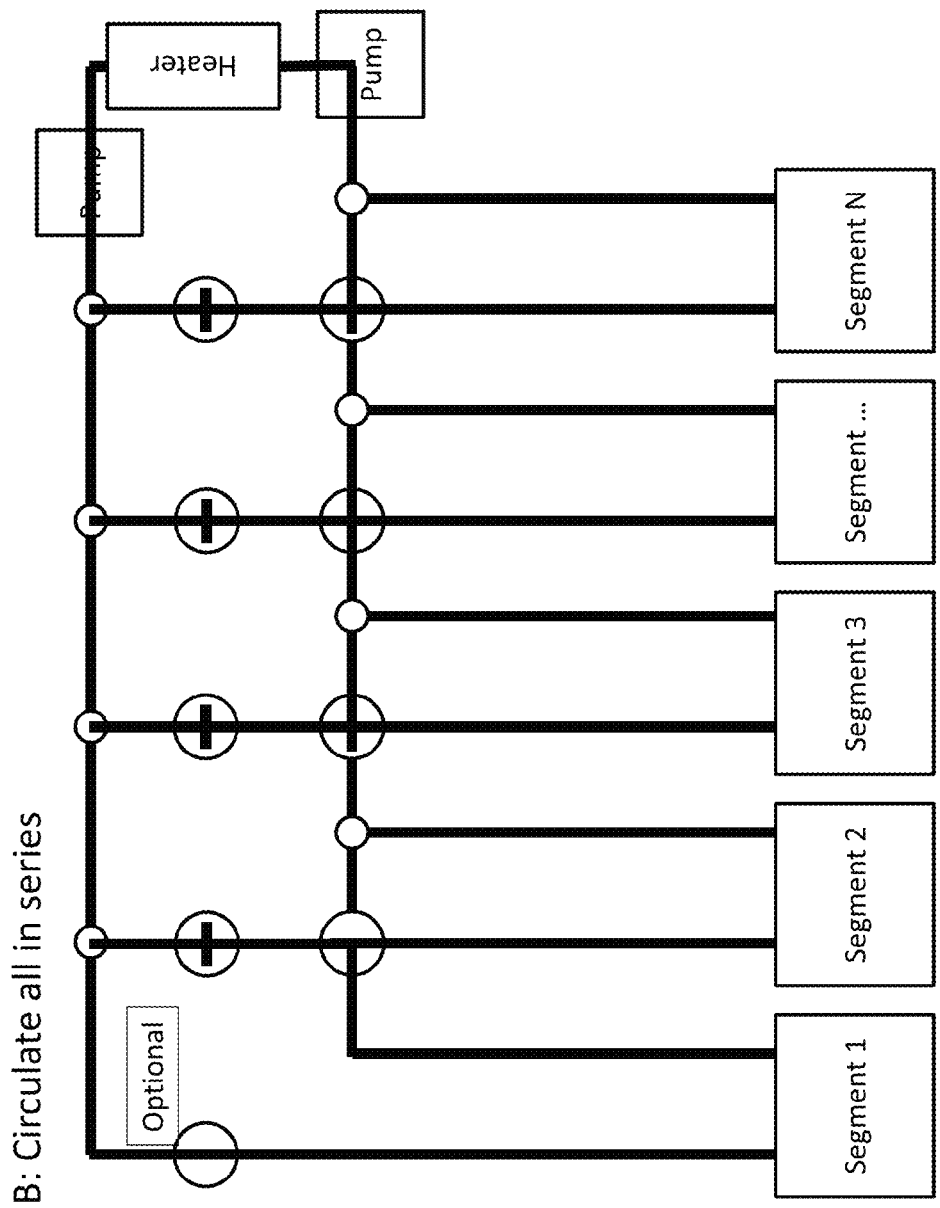

FIGS. 6A-E are simplified diagrams illustrating thermal management for a battery system according to an embodiment of the present invention. These diagrams merely provide an example, which should not unduly limit the scope of the claims. One of ordinary skill in the art would recognize many variations, alternatives, and modifications. For the configuration in FIGS. 6A-E, two pumps are provided to facilitate circulation of thermal transfer fluid between the heater and the segments of a battery group. FIG. 6A shows a scenario where all the valves are off and the heater provides no heating for the battery segments. FIG. 6B illustrates heating fluid only provided to the segment 1. For example, the valve 622 provides three way control, and it allows fluid to flow horizontally and up, but not down to the segment 2. FIG. 6C shows that the segment 634 is thermally coupled to the heater while other segments are not. FIG. 6D shows that segment 2 and segment 634 are thermally coupled to the heater while other segments are not; selective thermal coupling is accomplished by using the valves. FIG. 6E shows that all of the segment are thermally coupled to the heater, as the valves allows heating fluid pumped to the segment 1 to be circulated to other segments.

Figure 7:
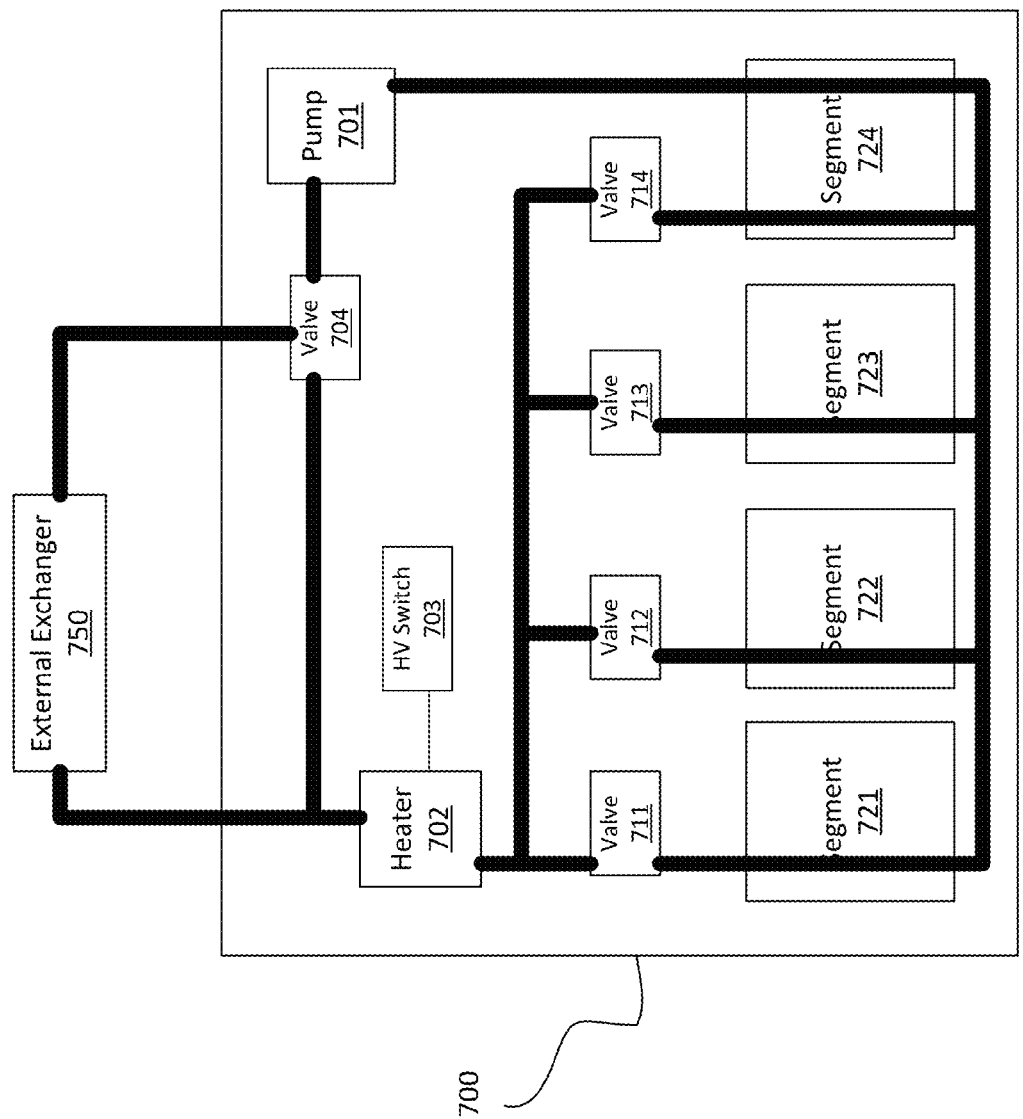
FIG. 7 is a simplified diagram illustrating configuration of a heating system according to an embodiment of the present invention.

FIG. 7 is a simplified diagram illustrating configuration of a heating system according to an embodiment of the present invention. This diagram is merely an example, which should not unduly limit the scope of the claims. One of ordinary skill in the art would recognize many variations, alternatives, and modifications. As shown in FIG. 7, a heating system 700 is coupled to an external exchanger 750. Among other features, the external exchanger 750 allows the heating fluid to be moved in and/or out of the heating system 700 as needed. For example, the flow of fluid between the external exchanger 750 and the heating system 700 is controlled by the valve 704.

The heater 702 is controlled by the HV switch 703 and it is used to heat the heat-carrying fluid. The pump 701 causes the fluid to move among heater 702, segments 721-724, and the external exchanger 750. The circulation of the fluid is controlled by valves 711-714. For example, the segments and thermal paths thereof are in parallel configuration. As explained above, thermal paths can be used to allow the transport of heat carrying fluid or vapor.

Figure 8:
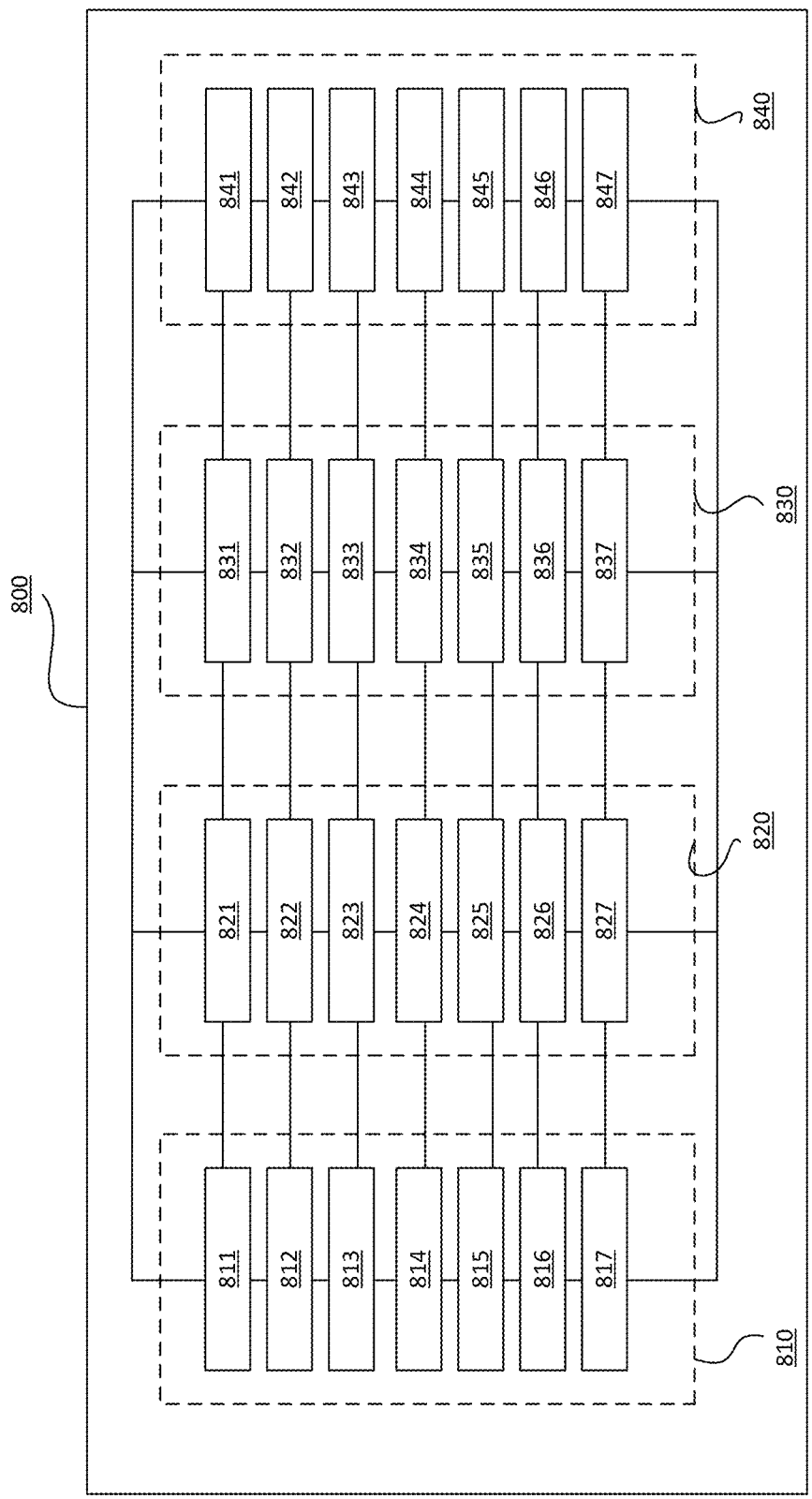
FIG. 8 is a simplified diagram illustrating a battery system according to an embodiment of the present invention.

FIG. 8 is a simplified diagram illustrating a battery system according to an embodiment of the present invention. This diagram is merely an example, which should not unduly limit the scope of the claims. One of ordinary skill in the art would recognize many variations, alternatives, and modifications. The battery system 800 includes battery segment 840 that serves as a booster group. Segments 810, 820, and 830 serve as primary battery group. Depending on the application, the primary and booster groups can be housed in the same pack or different packs. The cells of the battery segment 840 are configured in series. For example, battery cells 841-847 are in series. The battery segments 810, 820, 830, and 840 are configured in parallel. The cells within the battery segments are in series. It is to be understood that the number of cells varies depending on the application, and the number of cells in each segment and the number of segments shown in FIG. 8 merely provide an illustration. The cells of segment 810, 820, and 830 have substantially the same electrical properties (e.g., power density, cell voltage potential, internal resistance, etc.). A cell in a segment is electrically in parallel to corresponding cells of other segments. For example, the cell 811 of the segment 810 is in parallel with cell 821 of segment 820, cell 831 of segment 830, and cell 841 of segment 840. The parallel configuration of cells allows a cell of one segment to charge (or receive charge from) corresponding cells of other segments. As shown in FIG. 8, cells of booster segment 840 are in parallel to corresponding cells of other segments, which allows the booster segment 840 to be charged by other segments once other segments become operational. When segments 810, 820, and 830 are non-operational (e.g., at very low temperature), the booster segment 840 does not have current flow in or out of these segments, as they behave much like open circuit to the booster segment 840. Once segments 810, 820, and 830 become operational, their higher energy state would cause current to flow into the segment 840, thereby charging it. In various embodiments, cells of the booster segment 840 have different chemistry than that of cells of segments 810, 820, and 830. For example, the cells of the booster segment 840 are specifically configured to operate at low temperature, as explained above.

It is to be appreciated that the electrical configuration as shown in FIG. 8 can provide numerous advantages. For example, the configuration in FIG. 8 is sometimes referred to as "parallel first, series second" configuration, where cells are configured first in parallel across a group of battery cells before being connected to one another in series. In various embodiments, monitoring is provided for a chain of battery cells that are configured in series. For example, battery cells 811, 821, and 831 are configured in parallel, and a single sensor is used to monitor the voltage and/or other electrical properties, as opposed to a sensor required for each individual cell in some conventional configurations. In various embodiments, each cells comprises a fuse in case of cell failures and/or other problems. Additionally, fuses are provided between battery segments.

Figure 9:
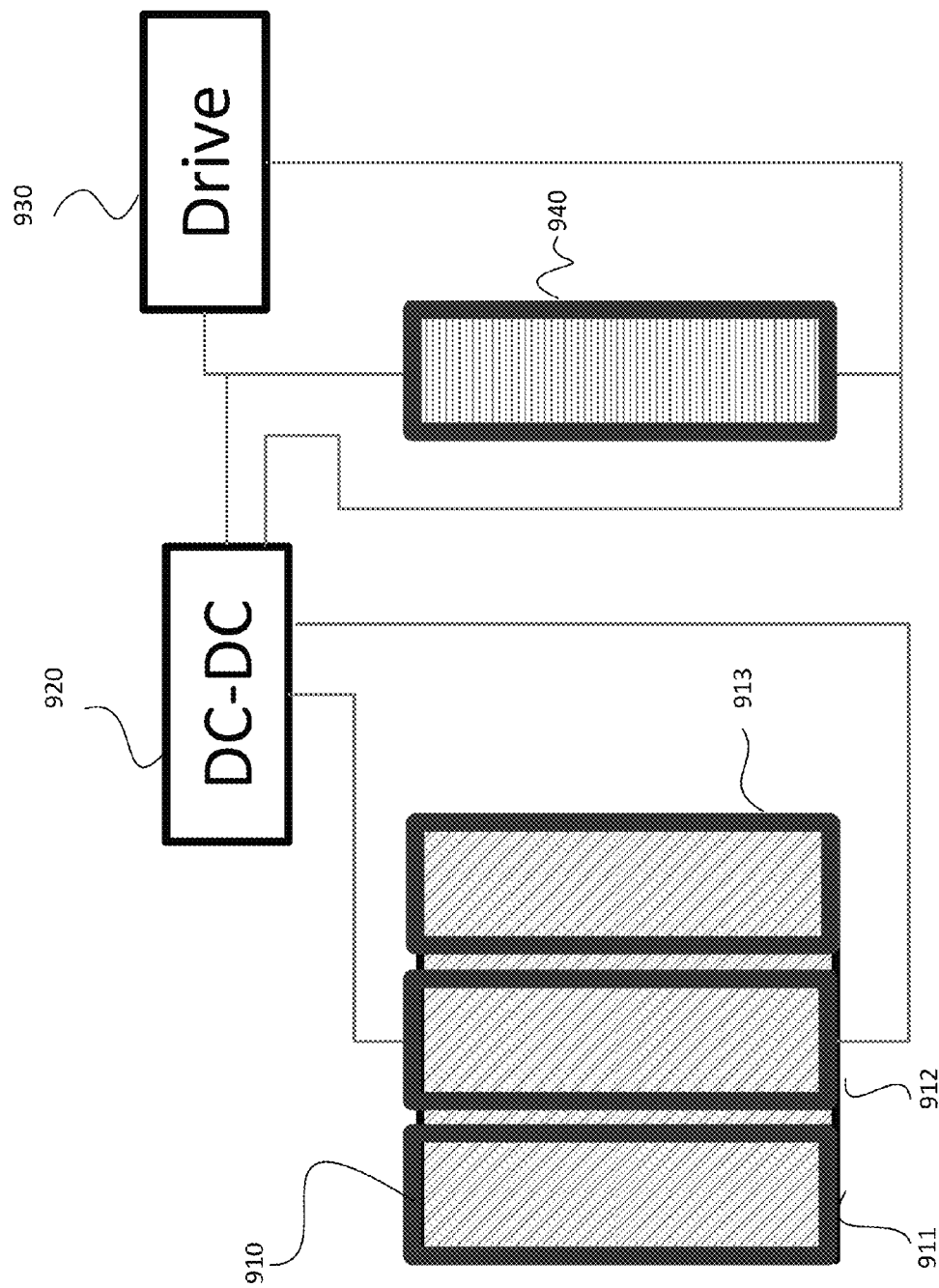
FIG. 9 is a simplified diagram illustrating a battery system where a primary battery group and a booster battery group are electrically coupled to each other in parallel via a power module according to an embodiment of the invention.

FIG. 9 is a simplified diagram illustrating a battery system where a primary battery group and a booster battery group are electrically coupled to each other in parallel via a power module according to an embodiment of the invention. This diagram is merely an example, which should not unduly limit the scope of the claims. One of ordinary skill in the art would recognize many variations, alternatives, and modifications. As shown in FIG. 9, primary battery group 910 is electrically coupled to booster battery group 940 via a DC-DC converter 920. Through the DC-DC converter 920, primary battery group 910 provides energy to drivetrain 930. The primary battery group 910 and the second battery group 940 have different battery chemistries. The second battery group 940 is configured to be capable of operating at a lower temperature than the primary battery group 910. The battery group 910 is in a "parallel first, series second" configuration as described above, where cells of battery segments 911, 912, and 913 are configured in parallel first, and the parallel cells are then configured in series.

Figure 10:
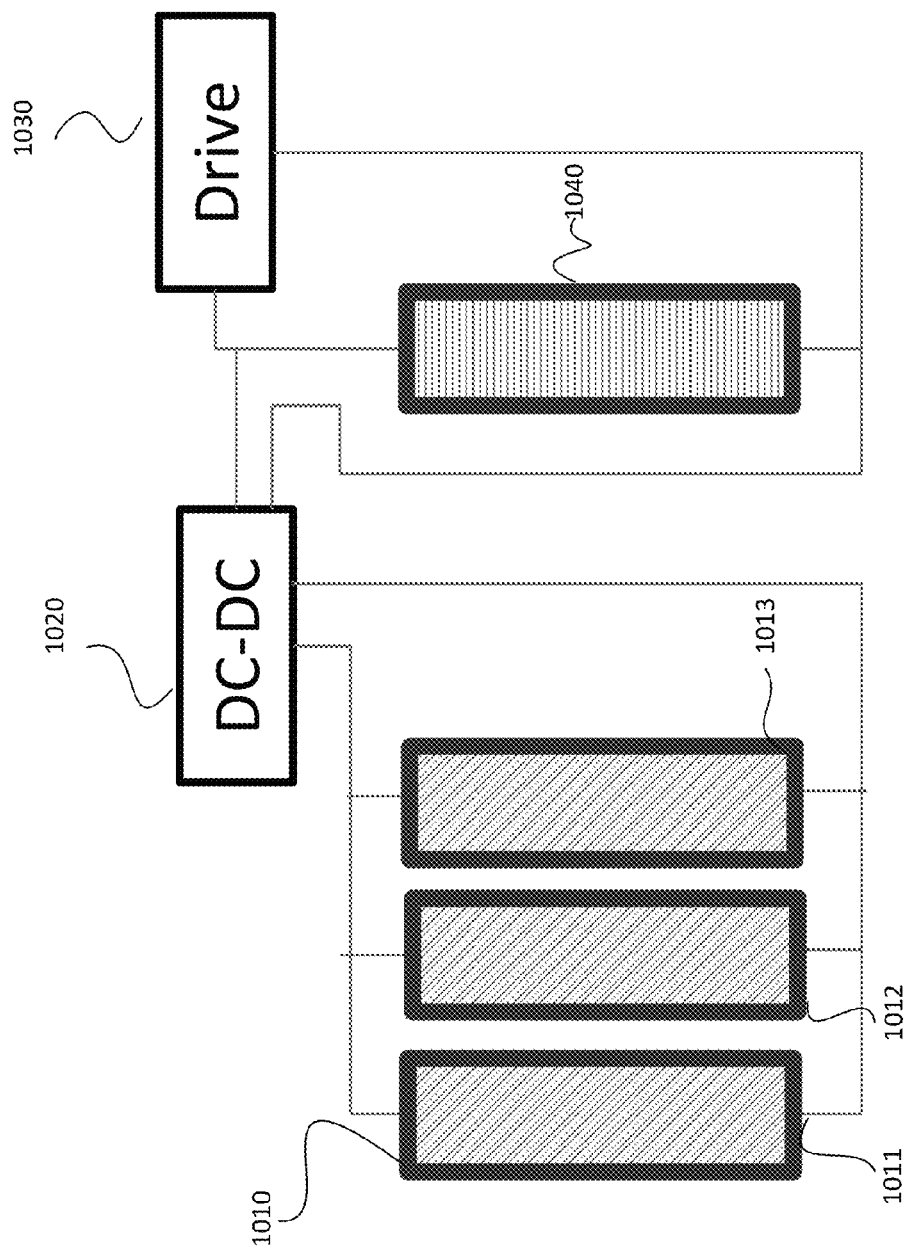
FIG. 10 is a simplified diagram illustrating a battery system where a primary battery group having battery segments configured in series and a booster battery group are electrically to each other in series via a power module according to an embodiment of the invention.

FIG. 10 is a simplified diagram illustrating a battery system where a primary battery group having battery segments configured in series and a booster battery group are electrically to each other in series via a power module according to an embodiment of the invention. This diagram is merely an example, which should not unduly limit the scope of the claims. One of ordinary skill in the art would recognize many variations, alternatives, and modifications. As shown in FIG. 10, primary battery group 1010 is electrically coupled to booster battery group 1040 via a DC-DC converter 1020. Through the DC-DC converter 1020, primary battery group 1010 provides energy to drivetrain 1030. The primary battery group 1010 and the second battery group 1040 have different battery chemistries. The second battery group 1040 is configured to be capable of operating at a lower temperature than the primary battery group 1010. The battery group 1010 is in a "series first, parallel second" configuration, where segments 1011, 1012, and 1013 each consists of a number of cells in series. At the segment level, segments 1011, 1012, and 1013 are in parallel.

Figure 11:
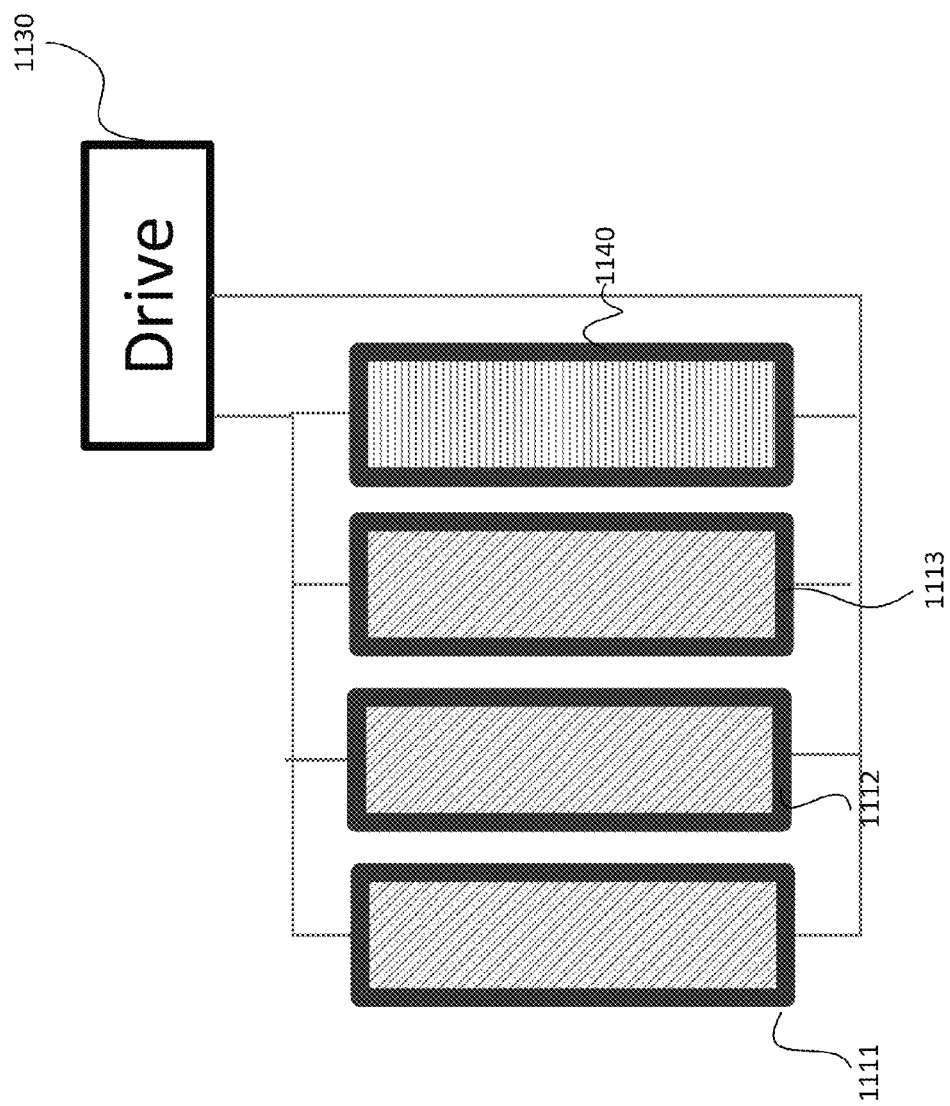
FIG. 11 is a simplified diagram illustrating a battery system where a primary battery group and a booster battery group configured in parallel according to an embodiment of the invention. This diagram is merely an example, which should not unduly limit the scope of the claims.

FIG. 11 is a simplified diagram illustrating a battery system where a primary battery group and a booster battery group configured in parallel according to an embodiment of the invention. This diagram is merely an example, which should not unduly limit the scope of the claims. One of ordinary skill in the art would recognize many variations, alternatives, and modifications. In FIG. 11, battery segments 1111, 1112, and 1113 together form a primary battery group, which is in parallel with the booster battery group 1140. Together, primary and booster battery group provide energy to the drivetrain 1130. The primary battery group and the booster battery group 1140 have different battery chemistries. The booster battery group 1140 is configured to be capable of operating at a lower temperature than the primary battery group. The primary battery group is in a "series first, parallel second" configuration, where segments 1111, 1112, and 1113 each consists of a number of cells in series. At the segment level, segments 1111, 1112, and 1113 are in parallel.

Figure 12:
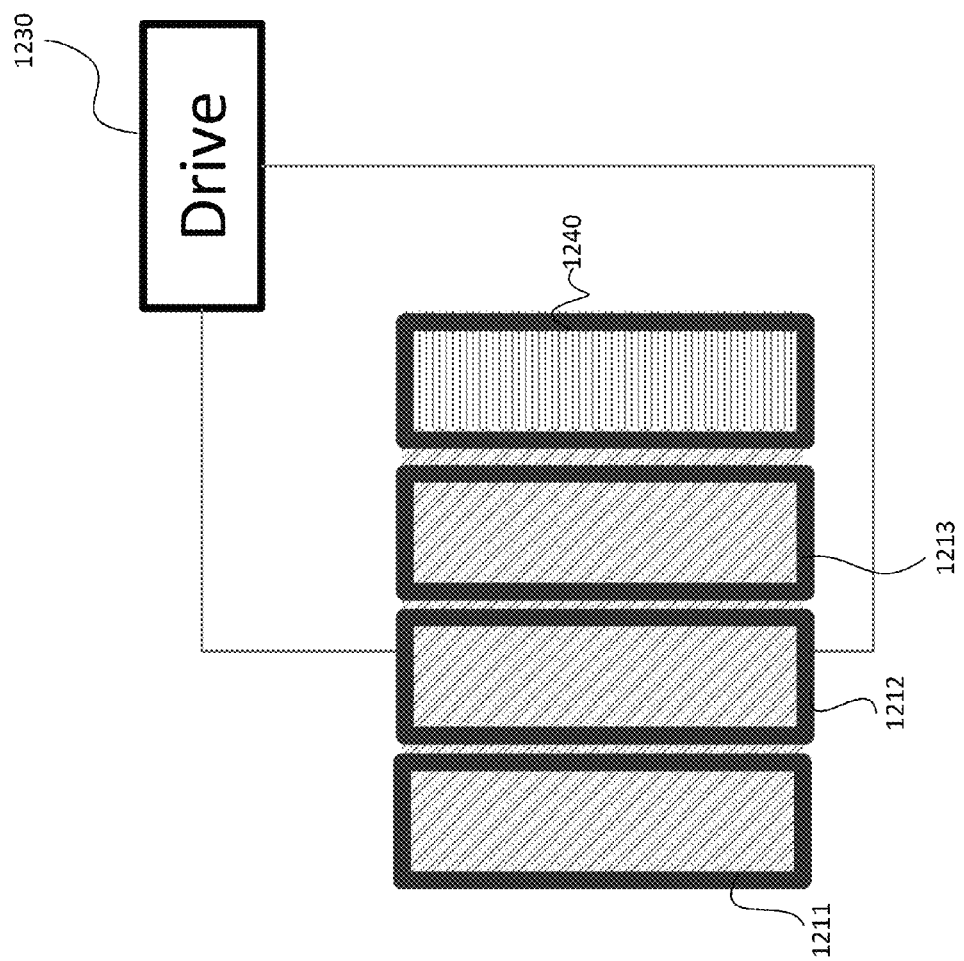
FIG. 12 is a simplified diagram illustrating a battery system where a primary battery group and a booster battery group having their cells configured in parallel according to embodiments of the present invention.

FIG. 12 is a simplified diagram illustrating a battery system where a primary battery group and a booster battery group having their cells configured in parallel according to embodiments of the present invention. This diagram is merely an example, which should not unduly limit the scope of the claims. One of ordinary skill in the art would recognize many variations, alternatives, and modifications. In FIG. 12, battery segments 1211, 1212, and 1213 together form a primary battery group which is in parallel with the booster battery group 1240. Together, the primary battery group and the booster battery group 1240 are in a "parallel first, series second" configuration described above. The primary battery group and the booster battery group 1240 may different battery chemistries or may have different internal structure. For example, battery group 1240 may have similar chemistry to group ??? but with thinner layers or smaller dimensions to promote mass transport. The booster battery group 1240 is configured to be capable of operating at a lower temperature than the primary battery group. Together, primary and booster battery group provide energy to the drivetrain 1230.

It is to be appreciated that depending on the application, other thermal configurations are possible as well. For example, additional pumps and/or valves can be used to control the flow of heating fluid from the heater. In additional to using heating fluid (e.g., water), other heating agents can use used as well, such as vapor.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A battery system comprising:
   a first battery group comprising battery cells, wherein the battery cells of the first battery group each comprise liquid electrolyte, the first battery group having a first capacity and operating at a first temperature;
   a second battery group comprising battery cells, wherein the battery cells of the second battery group each comprise a solid-state electrolyte, wherein the second battery group is an electrically coupled to the first battery group, the second battery group having a second capacity and operating at a second temperature, the second capacity being greater than the first capacity, the second temperature being higher than the first temperature;
   a first heating module electrically coupled to the first battery group;
   wherein the first heating module comprises a first thermal path thermally coupled to the battery cells of the first battery group, and a second thermal path including a first thermal segment and a second thermal segment, the first thermal segment being thermally coupled to the first battery group, the second thermal segment being thermally coupled to the battery cells of the second battery group; and
   a control module programmed to cause the first battery group to power the first heating module to selectively provide heat to the battery cells of the first battery group by the first thermal and the battery cells of the second battery group by the second thermal path.

2. The battery system of claim 1 further comprising a second heating module electrically coupled to the second battery group, wherein the second battery group is configured to power the second heating module when the second battery group is characterized by a temperature higher than a threshold level.

3. The battery system of claim 1 wherein the second battery group is configured to charge the first battery group if the second battery group is characterized by a temperature higher than a threshold level.

4. The battery system of claim 1 further comprising a second heating module electrically coupled to the second battery group.

5. The battery system of claim 1 wherein the first battery group is positioned within a thermally insulated housing.

6. The battery system of claim 1 wherein the first thermal path or second thermal path comprises a liquid material.

7. The battery system of claim 1 wherein the first thermal path or second thermal path comprises water.

8. The battery system of claim 1 wherein the first thermal path or second thermal path comprises one or more valves for selectively turning on the first thermal path and the second thermal path.

9. The battery system of claim 1 further comprising a sensor module for determining a temperature of the battery cells of the second battery group.

10. The battery system of claim 1 further comprising a sensor for determining one or more electrical characteristics of the battery cells of the first battery group.

11. The battery system of claim 1 wherein the first thermal path and the second thermal path are configured to lower the temperature of the battery cells of the second battery group.

12. The battery system of claim 1 wherein the first thermal path or second thermal path comprises a liquid material, the liquid material being characterized by a specific heat of at least 2 kJ/kgK.

13. The battery system of claim 1 wherein the battery cells of the first battery group are electrically coupled in parallel with the battery cells of the second battery group.

14. An electric vehicle comprising the battery system of claim 1.

15. The battery system of claim 1 wherein the battery cells of the first battery group are arranged in series.

16. The battery system of claim 1 wherein the first thermal path comprises a loop for circulating heating fluid for the battery cells of the first battery group.

17. The battery system of claim 1 wherein the battery cells of the first battery group and the battery cells of the second battery group are electrically coupled to each other in series via a power module.

18. The battery system of claim 1 wherein the first battery group has the same number of battery cells as the second battery group.

19. The battery system of claim 1 further comprising a housing, the first battery group and the second battery group being positioned within the housing.

20. The battery system of claim 1 further comprising a first housing and second housing, the first battery group being positioned within the first housing, the second battery group being positioned within the second housing.

21. The battery system of claim 1, wherein the first temperature is less than 0 degree C.

22. The battery system of claim 21 wherein the battery cells in the first battery group are electrically coupled in parallel with the battery cells in the second battery group.

23. The battery system of claim 21 further comprising a second heating module electrically coupled to the first battery group, wherein the second heating module comprises a third thermal path thermally coupled to the battery cells of the second battery group, wherein the first battery group is configured to power the second heating module if the first battery group is at or above a predetermined operational temperature.

* * * * *